United States Patent Office 3,830,752
Patented Aug. 20, 1974

3,830,752
HYDROCARBON CONVERSION CATALYSTS
Grant A. Mickelson, Yorba Linda, Calif., assignor to Union Oil Company of California, Los Angeles, Calif.
No Drawing. Division of application Ser. No. 148,194, May 28, 1972, Pat. 3,755,147, which is a continuation-in-part of Ser. No. 856,143, Sept. 8, 1969, Pat. 3,609,099, which is a continuation-in-part of Ser. No. 761,322, Sept. 20, 1968, now abandoned, and a continuation-in-part of Ser. No. 837,340, June 27, 1969, now abandoned. This application Oct. 16, 1972, Ser. No. 297,618
Int. Cl. B01j 11/06, 11/82
U.S. Cl. 252—435                    13 Claims

ABSTRACT OF THE DISCLOSURE

Hydrocarbon conversion catalysts of improved activity are obtained by activating foraminous refractory oxides combined with at least one thermally decomposable and/or oxidizable compound of a catalytically active metal upon calcination while contacting the composite with an accelerated flow of an oxidizing gas at a rate of at least about 2 s.c.f.m. per pound of said composite. Further advantage is realized by heating the composite to the prescribed calcination temperature at a controlled gradual rate. It is also generally desirable to assure that the inlet temperature of the oxidizing gas prior to contact with the composite is less than about 500° F.

---

This application is a division of copending application Ser. No. 148,194, filed May 28, 1971, now U.S. Pat. No. 3,755,147, itself a continuation-in-part of Ser. No. 856,143, filed Sept. 18, 1969, now U.S. Pat. No. 3,069,099, which in turn is a continuation-in-part of Ser. No. 761,322, filed Sept. 20, 1968, now abandoned, and of Ser. No. 837,340, filed June 27, 1969, now abandoned.

BACKGROUND AND DESCRIPTION

Hydrocarbon conversion catalysts comprising metal oxides and/or sulfides on refractory oxide supports are conveniently prepared by the impregnation of those supports with aqueous solutions of water soluble thermally decomposable and/or oxidizable compounds of the desired active metals. The metals of Groups VI and VIII of the Periodic Chart have found wide application particularly in the manufacture of hydrotreating and hydrocracking catalysts. Understandably a great deal of effort has been devoted toward improving the hydrocarbon conversion activity of these catalysts and simpylifying and improving the methods involved in their production. For example, I have observed that marked improvement in the activity of hydrocarbon conversion catalysts comprising Group VI and Group VIII metals is realized by the control of certain critical parameters in the preparation of the impregnating solutions, during impregnation of the refractory oxide support, and during drying of the resultant impregnated composite. I have now observed that catalysts of this class can be improved even further by the amelioration or complete elimination of certain detrimental effects which occur during the thermal activation of composites containing thermally decomposable and oxidizable compounds. Such catalysts are extensively employed for a wide variety of hydrocarbon conversions such as denitrogenation, desulfurization, hydrogenation, hydrocracking and the like.

Heretofore the impregnated composites have been activated by calcination in the most expeditious manner. Conventional methods involve exposing the impregnated composites directly to calcination temperatures, e.g., about 800° F., so that the material is rapidly brought to the desired calcination temperature. This approach is logically dictated by the economics of the calcination step. It is obviously preferable to make the most efficient use of the relatively large heating requirements involved in thermal activation of this type. However, during my investigation of this particular aspect of the procedure, I discovered that dramatic improvement in catalyst activity can be achieved by the observance of conditions during calcination which deviate from the procedures heretofore considered most desirable and which, in the absence of my discovery, appear to unduly complicate the calcination step. I have observed several consequences of the direct calcination procedures heretofore employed that justify the use of calcination conditions which would otherwise appear rather unorthodox in view of the overall objective of the calcination step. However, the consequent improvements in catalyst activity resulting from these procedures more than justify their use.

It is therefore an object of this invention to provide an improved hydrocarbon conversion catalyst. Another object of this invention is the provision of an improved hydrogenative hydrocarbon conversion process. Yet another object is the provision of an improved hydrofining catalyst. In accordance with another object of this invention there is provided an improved catalyst for hydrocracking hydrocarbons. In accordance with another object there is provided an improved hydrocarbon hydrofining process and catalysts therefor. Another object of this invention involves the provision of an improved hydrocarbon hydrogenation process and a catalyst for use therein.

Briefly, the calcination process I have discovered involves the intimate contact of the catalyst particles, pellets, granules, powder, etc., during calcination with a substanital volume of an oxidizing gas having a temperature lower than that of the catalyst. For example, the most desirable results are achieved when the catalyst particles, preferably of small particle size, are intimately contacted with at least about 1, generally at least about 2 and preferably about 3 to about 50 s.c.f. of air per pound of catalyst per minute. The extent of aeration required to obtain the dramatic activity improvements in a given system depends on several parameters. For example, greater relative air injection rates are required in batch systems than in continuous systems assuming both systems exhibit comparable contacting efficiencies. This is generally true due to the presence of higher concentrations of fresh untreated catalyst during the early stages of batch calcination. Consequently, more thorough contacting is required to preserve catalyst quality during the early stages of a batch calcination than is necessary in continuous systems such as efficient continuous rotary calcination. Higher air rates are also desirable at greater catalyst bed depth, larger particle size, higher active component concentration and faster heating rates.

The average temperature differential between the catalyst and air is generally at least about 20° F., preferably at least about 50° F. during heat-up period. In batch calcination, the air temperature is not always below the catalyst temperature. On the contrary, the catalyst temperature generally lags the temperatrue of the air passed through the catalyst, until the catalyst approaches 300 to 500° F. At that point the catalyst temperature increases very rapidly due to exothermic reactions in the catalyst composite, such as salt decomposition. It is at this point that contact of the catalyst with relatively cool air as described is believed to be critical.

It is generally most convenient to inject ambient air into the calcination zone in which the catalyst composite is supported on a permeable grid. The air passes through the grid and over the composite. Some heating of the air may result prior to contact with the composite depending on the design of the specific calcination apparatus. Even so, the initial air temperature, immediately prior to contact with the composite is usually less than 500° F. and preferably less than 300° F.

In accordance with one embodiment of this invention a dried impregnated catalyst composite of a thermally decomposable salt of at least one of the metals of Groups VI and VIII of the Periodic Chart on a refractory oxide support is activated by calcination in an oxygen containing atomsphere at a temperature of at least about 800° F. and preferably within the range of about 800 to about 1300° F. while intimately contacting the composite particles during calcination with the described volumes of relatively cool oxygen containing gas. As demonstrated by the illustrative examples hereinafter detailed, a dramatic increase in finished catalyst activity is realized by this calcination procedure. The exact reason for this effect is not presently attributable to any one factor alone. It is believed that one relevant parameter is the rapid removal of heat from the composite particles, particularly during that period of the calcination in which predominant exothermic reactions occur. One such reaction involves the decomposition of thermally decomposable salts in the impregnated composite. Such decomposition reactions are highly exothermic and result in the creation of hotspots in the catalyst particles if a relatively high temperature differential between the surface of the catalyst particles and the surrounding environment is not maintained during that period. The most critical period is that during which the composite is heated up to the desired calcination temperature. The predominant exothermic reactions, e.g., salt decomposition, generally occur above 300° F., usually from 300° F. to about 800° F.

The nature and extent of the deomposition reactions will, of course, depend upon the chemical composition of the impregnating solution and the salts deposited on the refractory oxide, as well as the concentration thereof. For example, the unactivated impregnated composite may contain a variety of salts such as nitrates, sulfates, halides, phosphates, and the like of either the active metals or ammonia or similar basic cations such as the alkali and alkaline earth metals. The calcinations of composites containing these compositions results in the occurrence of pronounced exothermic reactions, generally between about 300 and about 800° F., and quite often between about 350 and about 600° F., as indicated by differential thermal analysis. The heat generated by these reactions in a large mass of catalytic particles may be excessive to the point that extremely high surface temperatures result under conventional calcination conditions.

Additional factors which may account, at least in part, for the observed activity improvement are the removal of the gaseous components such as steam and salt decomposition products expelled from the product during calcination. The composition and concentration of these expelled products and the temperatures at which they are expelled will of course depend upon the composition of the impregnated composite.

During decomposition of the residual salts in the pores and on the surface of the catalyst, water vapor, ammonia, nitrogen oxides, sulphur oxides, halides, hydrogen halides, and perhaps even minor amounts of the corresponding acids, e.g., nitric, sulphuric, etc., are evolved. These may react with the active metals, metal oxides or refractory oxide support if not immediately removed form the composite particles. For example, the impregnation of a refractory oxide with a solution containing nitrate and ammonium ions results in the formation of ammonium nitrate on the impregnated composite. This salt dissociates, at temperatures above 300° F. in a very rapid highly exothermic reaction. Provision of the noted high volumes of oxygen-containing gas, e.g., air, during this period is particularly preferred. However, it is presently preferred that the composites be contacted with the described air rates at least until the desired calcination temperature is reached.

The superior activity of these catalysts is illustrated by way of comparison in the illustrative examples. However, as indicated above, the exact reasons for the observed superior activity cannot be determined with certainty. Nevertheless, it is only reasonable to conclude that the observed catalyst performance must necessarily be a manifestation of some physical or chemical properties of the composition. Consequently, it seems apparent that the compositions of this invention differ in some significant respects from compositions previously available in this area of technology. Unfortunately, the nature and degree of these physical and/or chemical distinctions have not yet been identified. However, that lack of information need not limit the utility of the compositions or methods herein described.

In accordance with another embodiment of this invention I have discovered a superior hydrogenative hydrocarbon conversion process in which a hydrocarbon feed is contacted with the described catalysts under a superatmospheric hydrogen partial pressure at conditions sufficient to react at least a portion of the added hydrogen with the hydrocarbon feed to an extent corresponding to a net consumption of added hydrogen. In another embodiment the hydrocarbon feed is reacted with added hyrogen under a superatmospheric hydrogen partial pressure and conditions sufficient to increase the hydrogen to carbon ratio of the feed by an amount corresponding to a net hydrogen consumption of at least about 10 s.c.f. of hydrogen per barrel of hydrocarbon feed.

In accordance with yet another embodiment there is provided an improved hydrogenative conversion process where a hydrocarbon feed boiling primarily above about 400° F. is contacted with the described catalyst under a superatmospheric hydrogen partial pressure and conditions of elevated temperature and total reaction pressure sufficient to produce at least about 110 moles of hydrocarbon product for every 100 moles of hydrocarbon feed contacted. In accordance with one variation of this embodiment the described feed is contacted under conditions sufficient to convert at least 20% of the hydrocarbon feed to products boiling below the initial feed boiling point. In another embodiment, the hydrocarbon feed is contacted with the described catalyst in the presence of at least about 2 p.p.m. nitrogen present as organonitrogen compounds under conditions sufficient to produce at least 110 moles of product for each 100 moles of feed and/or convert at least 25% of the feed to lower boiling products.

The compositions treated by this activation procedure can be prepared by either mulling, co-precipitating or impregnating a refractory support with either soluble or insoluble compounds of one or more metals of Groups VI and VIII of the Periodic Chart. Exemplary of the soluble Group VIII metal compounds are salts such as the nitrates, sulfates, acetates, halides, citrates, phosphates, phosphomolybdates, and the like. The nitrates and sulfates are presently preferred. Although impregnation with the corresponding halides can be easily effected, that approach is less preferred due to the evolution of corrosive halide decomposition products during activation. Exemplary of relatively insoluble Group VIII metal compounds are the carbonates and hydoxides of nickel and cobalt.

Illustrative Group VI metal compounds are the oxides such as molybdenum trioxide, molybdenum blue, tungstic oxide, etc.; the acids, e.g., molybdic, tungstic and chromic acids; metal salts such as the ammonium, alkali and alkaline earth metals, e.g., ammonium heptamolybdate, ammonium phosphomolybdate, ammonium paratungstate; and the complex; salts of Groups VI and VIII metals such as complex cobalt and nickel phosphomolybdates.

These compounds can be added to the support by any known means such as impregnation, mulling, co-precipitation, co-gellation, and the like. Impregnation by either dipping or spraying the support powder, pellets, particles, etc., is presently preferred. Solutions of the water soluble compounds, especially molybdenum trioxide, molybdic acid, tungstic oxide, tungstic acid, ammonium molybdates and tungstates and the nitrates and sulfates of the Group VIII metals, especially nickel and cobalt form the preferred impregnating solutions. The concentration of the Group VI metal component in the impregnating solutions is generally equivalent to about 5 to about 30, preferably about 10 to about 24 weight percent of the corresponding oxide. The active metals presently preferred due to their activity and ease of handling during catalyst preparation are molybdenum and tungsten of Group VI and nickel and cobalt of Group VIII.

The impregnated composites usually contain from about 5 to about 45 weight percent of the active metal components calculated as the corresponding oxides, preferably about 10 to about 25 weight percent. When combinations of Group VI and Group VIII metals are employed, the equivalent concentration of the Group VI metal oxide in the inactivated composite is usually about 5 to about 40 weight percent, preferably from about 10 to about 20 weight percent as the molybdate, tungstate, etc.

The equivalent concentration of the Group VIII metal oxide is usually about 1 to about 10 weight percent, preferably from about 1 to about 6 weight percent as the salt, e.g., nitrate, sulfate, chloride, etc. The composites can also include additional components such as phosphorus in the form of phosphate ion added during impregnation as described in copending applications Ser. No. 761,322 and Ser. No. 837,340. Exemplary of other materials which may be formed in or added to these compositions are ammonium carbonates, sulfates, halides, nitrates, etc., formed in the impregnating solution by interaction of the several active metal compounds and/or added base such as ammonium hydroxide, ammonia, or the Group VIII metal hydroxides and carbonates described in copending applications Ser. No. 761,322 and Ser. No. 837,340.

Several procedural steps can be employed in the impregnation of the catalyst substrate with the compositions referred to. The single-dip or pore volume method involves contacting the catalyst support with the impregnating solution generally by dipping for a period sufficient to fill the pores with impregnating medium. The application of vacuum is generally preferred in the latter approach. The impregnating solution can more readily displace air trapped in the interior pore volume of the catalyst support at reduced pressures. The amount of solution and consequently the amount of active components retained on the support will depend largely on the pore volume and surface adsorption of the support. In general, these supports will have surface areas of at least about 50 square meters per gram and pore volumes of at least about 0.4 cc./gr. sufficient to retain the desired amount of solution in a single step. Aluminas and silica-stabilized aluminas generally have pore volumes of 0.6 to about 1.4 cc./gr. and pore sizes ranging from 100 to 30,000 angstroms.

That some of these compositions can be prepared in a single step is a significant advantage of the novel impregnating solutions described in the above noted copending applications. Relatively highly concentrated solutions, containing sufficient amounts of active components to impart the necessary active component concentration in a single pore saturation step, can be maintained in stable form for considerable periods, even in the presence of the refractory oxide supports.

Another impregnating method which has found wide application due to the previous necessity for maintaining relatively low active component concentrations is the cyclic or multi-dip procedure wherein the active support is repeatedly contacted with impregnating solution with or without intermittent drying. As previously mentioned, this procedure is less desirable in that it necessitates the use of procedures more complicated than the single-dip or spray technique. Another procedure employed by the prior art, which is not necessary with these impregnating solutions involves a prolonged contacting step at slightly elevated temperatures, e.g., 100 to 150° F., to promote the precipitation of active components onto the support.

As pointed out in my above noted copending applications, the formation of crystalline precipitates during the impregnation step should sometimes be avoided. Therefore the use of impregnation methods which result in the formation of precipitates or crystalline deposits is not preferred since the avoidance of these effects sometimes enables the production of more active catalysts. However, the improvements in activity which result from the novel activation procedures herein discussed are observed in composites produced in essentially any manner although the methods discussed in my noted copending applications produced catalysts of markedly superior activity.

The carrier may be any conventional foraminous catalyst carrier such as silica, alumina, magnesia, zirconia, titania, beryllia, kaolin, kieselguhr, activated carbon, pumice, and physical and chemical combinations thereof such as silica-alumina, silicamagnesia, crystalline and amorphous aluminosilicates, etc. Pretreatment, such as calcination or steaming of the carrier is usually employed. Types of carrier, preparation thereof, methods of pretreatment and the procedures employed in impregnation of the carrier are all conventional and are disclosed in detail in the above-mentioned U.S. patents. The preferred carrier for use in the present invention is alumina, preferably stabilized with up to about 40% of silica.

A particularly preferred impregnated composite and a method for preparing the same is described in my copending application Ser. No. 837,340, filed June 27, 1969, which is a continuation-in-part of my copending application Ser. No. 761,322, filed Sept. 20, 1968. Those applications describe the preparation of highly active hydrocarbon conversion catalysts of molybdenum and Group VIII metals by impregnating refractory oxides with highly stable solutions of soluble compounds of the active metals and an acid of phosphorus at $P/MoO_3$ weight ratios of from about 0.1 to about 0.25 and initial pH values of about 1 to about 2. As discussed in those applications, impregnating solutions having a prescribed $P/MoO_3$ ratios and initial pH values are highly stable and enable the use of impregnating solutions of much higher concentration so that the desired amounts of active metal components can be deposited on the refractory oxide in a single step. Although composites prepared by those procedures are presently preferred, the applicability of the activation process herein described and the dramatic increase in catalyst activity resulting therefrom are in no way limited to systems involving composites prepared by the procedures described in my copending applications.

In accordance with the presently preferred single-step impregnation technique the desired metal compound, e.g., ammonium heptamolybdate, is dissolved, or partially dissolved and partially suspended in water. The acid of phosphorus, e.g., orthophosphoric acid, preferably in the concentrated form (75–85 weight percent) is then added in such quantity that the equivalent weight ratio of phosphorus to molybdenum trioxide in the solution is about 0.1 to about 0.25, preferably 0.12 to about 0.20. The molybdenum and phosphorus compounds are added in such amounts that the resultant absolute concentrations of each fall within the ranges previously described. The initial pH of the resultant solution is usually within the range of about 1.0 to about 2.0. Under these conditions all of the molybdenum compound is dissolved. As previously mentioned, the pH can be increased slightly if desired by the addition of one or more of the basic materials described. If pH reduction within this range is desired, additional acid of phosphorus should be added. The Group VIII metal compound, e.g., nickelous nitrate, preferably in solution as the hexahydrate salt, is then added to the solution of the phosphorus acid and Group VI metal compound to produce a final composition preferably having an equivalent Group VIII metal oxide concentration of about 2 to about 5 weight percent.

The resulting impregnated composites are then dried and activated by calcination under the conditions described. Although the drying and calcination can both be effected in a single step, it is presently preferred that the composites be dried prior to subjecting them to the elevated temperatures involved in calcination. In the presently preferred drying procedure described in my copending applications, the wetted impregnated catalyst particles are gradually dried at a temperature within the range of about 180 to about 350° F., preferably from about 200 to 250° F. by heating gradually to that temperature, e.g., at about 20° F./minute, or less, and maintaining the composite at temperature for 10 minutes to about 10 hours, to reduce the water content to less than about 4 weight percent, preferably 1 to 2 weight percent.

The advantages of the preferred impregnating method and the manner in which it contributes to improvements in catalyst activity are associated, at least in part, with the manner in which the active components are distributed on the support surface. On the other hand, the advantages associated with the novel calcination process herein described and the characteristics of the composites necessary to enable the accomplishment of those objectives are believed to relate more to the overall composition and structure of the composite rather than to the manner in which the active components are distributed on the catalyst carrier. As a result, the novel calcination procedure finds application in the activation of catalysts prepared by any impregnation co-mulling, or co-precipitation procedure having chemical compositions similar to the catalyst herein described.

The preferred calcination can be accomplished by any one of several procedures, provided precaution is taken to facilitate intimate contacting of the volumes of air required and the composite particles. I have also found that the composites should be relatively small, i.e., about ⅛ inch or less and preferably not substantially greater than about ¹⁄₁₆ inch average diameter. Substantial benefit can be achieved by this calcination process when using particles of larger average diameters although more active products result from the use of relatively small particles. Actually, an even more significant effect can be realized by the use of powders, although the formation of pellets from calcined powders is relatively difficult. It is therefore generally preferred that the pellets or extrudates be produced before calcination, although they should be relatively small in order to derive the most benefit from the activation step.

The described calcination can be conducted in fluid calciners, fixed bed calciners at gas velocities insufficient to fluidize the catalyst particles, rotary drum calciners, vibratory or chain type conveyers, and similar apparatus having provision for intimately contacting the catalyst particles throughout the calcination process with the noted volumes of air. This contacting requirement is easily met in fluid calciners. When rotary calciners are used they should be provided with radially inwardly extending baffles which pick up the catalyst particles on rotation of the drum and drop them through a stream of air provided by air jets positioned on the interior of the rotary drum calciner so that intimate contact between the catalyst particles and air is achieved. The air stream with which the catalyst particles are contacted can be preheated although it is presently preferred that the air be introduced to the calciner at ambient temperature. In any event, the contacting air stream should be introduced at a temperature below about 300° F. so that it contacts the catalyst at a temperature less than about 500° F., preferably below 300° F. As a general rule, sufficient air should be introduced into the calciner in proportion to the catalyst depth in the calciner, the temperature of the catalyst particles and retention time in the calciner to maintain an average temperature differential between the catalyst particles and the surrounding air of at least about 50° F. This is particularly desirable when the catalyst reaches temperatures of about 300° F. and above.

The term hydrogenative hydrocarbon conversion is intended to include all reactions in which hydrogen is reacted with hydrocarbon feedstocks. These feeds include all forms of hydrocarbons such as aliphatic, cycloaliphatic, olefinic, aromatic (including alkaryl and aralkyl aromatic compounds), and organonitrogen and organosulfur compounds, particularly those found in conventional hydrocarbon feeds. These conversion mechanisms involve the reaction of hydrogen with carbon-to-carbon single bonds, carbon-to-carbon double bonds, aromatic rings, nitrogen-to-carbon and sulfur-to-carbon bonds, or, in some cases, the reaction of hydrogen with either or both substituents adjacent the bond either during or after bond cleavage.

These hydrogenative conversion systems are generally characterized by the presence of substantial amounts of added hydrogen, conduct of the conversion under a superatmospheric hydrogen partial pressure and a net hydrogen consumption. Within this class of reactions there is also included destructive hydrogenatoin, i.e., hydrocracking, in which sufficient carbon-to-carbon bond hydrogenation is effected to convert a substantial proportion of the feed to materials boiling below the initial feed boiling point. These severe hydrogenation systems are distinguished from other hydrogenative reactions such as aromatics and olefin hydrogenation, denitrogenation and desulfurization, by the substantial reduction in initial boiling point of the hydrocarbon feed. For the purposes of this invention hydrocracking systems are considered to involve the conversion of at least 20 volume percent of the hydrocarbon feed to materials boiling below the initial boiling point of the feedstock. In most commercial applications it is generally preferred to effect the conversion of at least 40 volume percent of the feed to materials boiling below the initial feed boiling point. However, at times, the hydrocracking systems cannot be so characterized due to the inclusion of minor amounts of relatively low boiling materials in the original feedstock. In those situations, these systems are more readily distinguished from the less severe hydrogenative conversion mechanisms by characterizing the number of moles of product produced relative to the amount of feedstock reacted. These systems usually involve the production of at least 110 moles of product for each 100 moles of hydrocarbon feed. However, higher conversions involving the production of at least 120 moles of hydrocarbon product for each 100 moles of feed are generally preferred. These reactions can be even further characterized by relatively higher net hydrogen consumption which usually exceeds about 250 standard cubic feet net hydrogen consumed per barrel of hydrocarbon feed.

These methods are particularly attractive for severe hydrocracking conversion of feedstocks containing substantial amounts of organonitrogen compounds. Such feeds contain at least about 2, usually in excess of 10 parts per million nitrogen as organonitrogen compounds. However, most commercial feedstocks have nitrogen concentrations in excess of 50 parts per million. The conversion systems of this invention are particularly attractive when operating on such high nitrogen feeds due to their high tolerance and activity toward organonitrogen compounds. In fact, the requirement of a pretreatment zone to reduce nitrogen concentrations to the levels required by other catalysts can be avoided by the use of these methods.

Another advantage of these methods is their activity for the conversion of feeds containing susbtantial amounts of aromatic constituents. This superiority is evidenced when operating on feeds containing as little as 5% aromatic compounds. However, most hydrocracking or hydrogenation feeds contain at least about 10 volume percent aromatics, usually about 10 to about 80 volume percent.

Essentially any hydrocarbon feed which can be reacted with hydrogen in the presence of the described catalyst can be employed in the methods of this invention. For example, these methods can be employed to hydrogenate olefins such as ethylene, butenes, and cyclohexenes, dodecenes, alkylene substituted aromatics and the like. However, as a general rule, these hydrogenative conversion methods are employed to convert feeds boiling primarily above about 100° F. In most applications the principal part of the feedstock will boil in excess of about 400° F., usually within the range of about 200 to 1100° F.

The reaction conditions required to substantially increase the hydrogen-to-carbon ratio will of course depend somewhat on the characteristics of the feedstock in that the nature of the hydrocarbons to be converted will determine the reaction mechanisms which must be effected in order to accomplish a significant degree of hydrogen consumption. However, the severity of these conditions can be readily determined by the skilled artisan simply by contacting the selected feedstock with the described catalysts at a selected set of operating conditions, analyzing the product and then varying the process conditions to obtain the desired degree of conversion and selectivity. As a general rule, reaction temperatures will be at least about 400° F., usually in excess of about 600° F., The most common conversion temperatures range from 400 to 950° F., especially 600 to 800° F. Reaction pressures of at least about 500 p.s.i.g., usually 500 to about 5000 p.s.i.g. are effective for accomplishing most desired conversions. Superatmospheric hydrogen partial pressures are always employed. Hydrogen is usually added in amounts corresponding to at least about 50 standard cubic feet per barrel, normally in excess of about 100 standard cubic feet per barrel. However, most hydrocarbon feeds will be effectively converted in the presence of hydrogen added in amounts of about 400 to about 20,000 standard cubic feed per barrel. These hydrogen concentrations usually correspond to hydrogen partial pressure of at least about 50 p.s.i.g., generally about 100 to about 3000 p.s.i. depending on the feedstock and the nature of the conversion desired. For example, hydrofining conditions often include temperatures of 700 to 800° F. and hydrogen partial pressures of about 750 to 200 p.s.i.

The duration over which the hydrocarbon feed is maintained in contact with the catalysts at conversion conditions will also vary considerably depending upon the nature of the reaction conducted and the extent of conversion and selectivity desired. However, for most systems contact times in excess of about 1 minute are usually required while reaction times of at least 5 minutes are generally preferred. In fixed bed catalyst systems the described degree of contacting is usually effected at liquid hourly space velocities (LSHV) in excess of about 0.1, usually in excess of about 0.4 and generally within the range of about 0.4 to about 15.

The following examples serve to more particularly illustrate the invention and the advantages thereof.

EXAMPLES 1-6

The characteristics and advantages of the preferred activation procedure are illustrated by the following examples. In these examples composites prepared by single dip impregnation and activated by several different procedures were evaluated with regard to hydrofining activity. The chemical composition and denitrogenation activity of the catalysts prepared in each example are summarized in Table 1.

The impregnating solution was prepared by partially dissolving 410 grams of ammonium heptamolybdate in 750 ml. of distilled water, adding 170 grams of concentrated phosphoric acid (85% $H_3PO_4$), 240 grams of nickelous nitrate hexahydrate and enough water to make up to 1190 ml. of solution at 86° F. with a pH of 1.2 to 1.3. This solution was used to immerse 500 grams of 1/16 inch silica stabilized alumina extrudates containing 4.95 weight percent silica. The flask containing the solutions and extrudate was evacuated to about 20 to 24 inches of Hg and shaken intermittently for 15 minutes. The excess solution was then separated from the wet extrudates of a #5 Büchner funnel without filter paper. The wet pellets were dried and calcined by several different techniques described in the following examples. In each instance that air was introduced into the furnace, the inlet air temperature was 75° F.

Example 1

The wet impregnated pellets were dried in an oven at 200° F. and held in the oven overnight (16 hours). The dried pellets were calcined in a top opening Kress muffle furnace on a stainless steel screen tray at a rate of 50° F./hr. to 900° F. and held at 900° F. for two hours. Ambient air at 75° F. was passed into the bottom of the furnace at a rate of about 7 standard cubic feet per minute per pound of catalyst.

Example 2

The wet impregnated pellets were placed on the stainless steel screen tray and dried and calcined at a rate of 50° F. per hour with a flow of compressed ambient air (75° F.) into the bottom of the Kress furnace at about 7 standard cubic feet per minute per pound. The average temperature differential between the catalyst and ambient air was about the same as in Example 1.

Example 3

The wet impregnated extrudates were oven dried by heating gradually to 190° F. and held at that temperature for 16 hours. The dry extrudates were then placed in a Pyroceran dish in a bed about 2 to 2½ inches deep and calcined in a Lindberg muffle furnace without air injection. The heating rate was as rapid as possible, 900° F. being reached in about 45 minutes. The specimen was held at 90° F. for an additional 60 minutes. The ambient reaction temperature and the temperature in the catalyst bed were continuously recorded. The temperature in the catalyst bed lagged behind that of the furnace up to about 400° F. The catalyst bed temperature then increased very rapidly and reached 80° F. in less than 10 minutes at which time the bed temperature was about 200° F. hotter than the ambient furnace temperature. At that point the temperature of the ambient air in contact with the catalyst was at least 200° F. less than the catalyst temperature. The furnace temperature was monitored by a thermocouple positioned immediately above the catalyst bed. This thermocouple was in intimate contact with air exiting upwardly out of the bed and was exposed to the furnace radiant heating elements. The catalyst temperature was monitored by a thermocouple in intimate contact with the catalyst bed. Consequently the temperature of the air in contact with the catalyst must have been at least 200° F. below the catalyst temperature at that point in the calcination. It is presently believed that mitigation of the immense localized heat buildup associated with this exothermic decomposition contributes, at least in part to the dramatic activity improvement realized by this procedure.

Example 4

The wet impregnated extrudates were spread on the stainless steel screen tray in the Kress box muffle furnace preheated to 900° F. Air was passed into the bottom of the furnace at about 7 standard cubic feet per pound of catalyst per minute. The extrudates were very rapidly dried and heated to 900° F. in about 25 minutes. Salt decomposition began in a few minutes and was completed in about 10 minutes. The specimen was held in the furnace for an additional two hours at 900° F. The temperature of the ambient air after passing through the catalyst was at least about 20° F. below the catalyst temperature after the catalyst reached a temperature of 300° F.

Example 5

The wet impregnated extrudates were dried and calcined in a manner identical to Example 1 but were heated only to 800° F. and held at that temperature for two hours.

Example 6

A layer of wet impregnated extrudates ¼ inches deep on a square stainless steel screen tray was placed in a large oven with a circulating fan. Air was not injected during this operation. The oven was heated gradually at an average rate of 60° F. per hour to 650° F. The extrudates were then removed and placed in a Pyroceran dish and calcined an additional hour at 650° F. in a muffle furnace with a good air purge. The extrudates of this specimen contained cores of darker colored material and did not appear to be completely activated. This conclusion was verified by the low activity of the resultant catalyst.

TABLE 1

| Example number | Percent MoO₃ | Percent NiO | Percent P | Calcination temp., °F. | Heat rate, °F./hr. | Time at cal. temp., hr. | Air rate, s.c.f.m./lb. | Denitrogenation activity Hrs. on feed | Denitrogenation activity Percent of ref. |
|---|---|---|---|---|---|---|---|---|---|
| 1 | 18.4 | 2.97 | 2.96 | 900 | 50 | 2 | 7 | 60 | 150 |
| 2 | 18.2 | 2.96 | 3.04 | 900 | 50 | 2 | 7 | 60 | 154 |
| 3 | 17.4 | 2.93 | 2.81 | 900 | 930 | 1 | None | 52 | 100 |
| 4 | 17.7 | 2.94 | 2.91 | 900 | (ᵃ) | 2 | 7 | 60 | 125 |
| 5 | 18 | 3 | 3 | 800 | 50 | 2 | 7 | 60 | 150 |
| 6 | 17.4 | 2.93 | 2.81 | 650 | 60 | 1 | (ᵇ) | 32 | 98 |

ᵃ 900° F. reached in 25 minutes.
ᵇ Internal air culation and nominal bleed.

These results demonstrate that catalysts activated in the presence of a vigorous air supply have markedly higher activity than those activated at conventional conditions. The catalyst of Example 5 which was calcined to a maximum temperature of only 800° F. is just as active as those calcined to a maximum temperature of 900° F. However, the catalyst of Example 6 which was calcined to a maximum temperature of only 650° F. with good air circulation was definitely inferior. Example 3, supra, and several of the following examples show conclusively that activation of composites in the absence of the prescribed aeration produces catalysts of markedly inferior denitrogenation activity.

EXAMPLES 7–13

The following examples illustrate the effect of intimate contact between air and catalyst in a commercial rotary calciner. The extrudates employed in these examples were prepared as follows. Two hundred and sixty-one pounds of 28% MoO₃ liquor, prepared by adding ammonia to MoO₃ powder suspended in water, was added to a weigh tank and 36.4 pounds of ammonia dimolybdate crystals were added and dissolved in the same tank. Then 73 pounds of 75% orthophosphoric acid was gradually added to the above solution. The pH of the resulting combination was about 1.7. Next 68 pounds of nickelous nitrate hexahydrate crystals were added and dissolved. The pH of the resulting solution was about 1.2. This solution was then diluted with water to produce a composition containing 22.5 weight percent MoO₃; 3.8 weight percent NiO and 3.8 weight percent phosphorus on an equivalent basis at a pH of 1.2.

Support extrudates, 400 pounds per batch, were weighed and transferred to a rotating drum about 4 feet in diameter and 12 feet long, with baffles and plows to thoroughly mix the wetted extrudates. The impregnating solution was then sprayed onto the extrudates through a spray bar with six nozzles. About 14 minutes were required to spray the solution onto the pellets and to wash down the vessel and displace the solution in the lines with water. Each batch of sprayed extrudates were agitated for another 10 minutes and then transferred to two 55 gallon drums and aged for about 2 hours under ambient conditions.

The aged extrudates were dried for 30 minutes in a through-circulation Proctor and Schwartz moving perforated belt drier with hot air and combustion gases at 250° F. fed at the discharge end of the belt.

Portions of the dried extrudates were activated under different conditions in a commercial rotary calciner 26 feet long, 3 feet in diameter, and etxernally heated in 3 six-foot sections by independently controlled gas burners. The shell temperature was maintained at about 400° F. in the heating zone nearest the feed end of the kiln, 600° F. in the center sections and 900° F. in the heating zone closest to the discharge end. The end plate at the discharge end of the kiln was removed to provide a free flow of air into the rotary kiln. In each run ambient air at 70° F. was drawn through the rotating cylinder counter current to the flow of the extrudate at a rate of about 350 s.c.f.m. Several runs were made at different feed and kiln rotation rates. The feed rate and the rotation rate of the kiln determined the amount of material in the kiln at any moment which was used to determine the depth of the bed of extrudates moving through the kiln. The kiln rotation rate determined the residence time of the extrudates in the kiln. A composite sample of the extrudates discharged from the kiln was taken from each run after equilibrium conditions had been established. The variables studied for each run and the composition and denitrogenation activity of the catalyst obtained are shown in Table 2.

TABLE 2.—SPRAY IMPREGNATED EXTRUDATES ACTIVATED IN A COMMERCIAL ROTARY CALCINER

| Example number | Rotation rate of kiln, r.p.m. | Feed rate, lbs. per min. | Extrudate bed depth in kiln during activation, in. | Extrudate residence time in kiln, min. | Relative air injection rate, s.c.f.m./lb. | Chemical composition, wt. percent MoO₃ | Chemical composition, wt. percent NiO | Chemical composition, wt. percent P | Denitrogenation activity test Hrs. on feed | Denitrogenation activity test Percent of reference catalyst |
|---|---|---|---|---|---|---|---|---|---|---|
| 7 | 1.65 | 1.5 | 1 | 37 | 6.4 | 19.4 | 3.39 | 2.88 | 60 | 134 |
| 8 | 1.65 | 3 | 2 | 37 | 3.2 | 19.2 | 3.34 | 3.16 | 60 | 140 |
| 9 | 1.65 | 6 | 4 | 37 | 1.6 | 18.5 | 3.58 | 3.22 | 60 | 132 |
| 10 | 1.65 | 9 | 6 | 37 | 1.1 | 18.3 | 3.40 | 3.44 | 60 | 137 |
| 11 | 1.65 | 11 | 8.5 | 37 | 0.86 | 20.4 | 3.48 | 3.15 | 60 | 115 |
| 12 | 0.38 | 3 | 9.5 | 150 | 0.78 | 19.4 | 3.44 | 3.22 | 60 | 123 |
| 13 | 0.38 | 0.5 | 2 | 150 | 4.7 | 19.4 | 3.37 | 3.21 | 60 | 140 |

The activity ratings of all the catalysts except two, Examples 11 and 12, were substantially in excess of the conventional catalyst and ranged from 130 to 150% of the reference catalyst. The compositions of all the calcined products were essentially the same. The catalysts of Examples 11 and 12 definitely had lower denitrogenation activities than did the remaining catalyst. In those runs the depth of the bed of extrudates in the kiln during activation was about 9 inches, higher than any other operation. The lower activity of these products is believed to be due to the lack of intimate contacting between the air and the catalyst during activation. It is also evident, by comparison of Examples 12 and 13, that residence time is not a critical factor as long as sufficient time is allowed to effect complete activation. However, the necessity of maintaining a relatively low bed depth of less than about 8 inches, preferably less than 6 inches, to promote intimate contacting between the air and catalyst is readily apparent. Higher rotation rates, i.e., 0.5 to 2 r.p.m., are also generally preferred as higher catalyst distribution rates and better contacting are thereby achieved.

These results, particularly Example 10, further demonstrate that relative air injection rates as low as 1.1 s.c.f.m./lb. can be effective in a continuous process at otherwise suitable conditions. It is believed that such lower air injection rates can be tolerated in a continuous system because of substantial portion of the catalyst in the kiln has already passed through the critical stage, i.e., the temperature range of 300 to 900° F. Consequently the deleterious thermal composition occurs at a relatively more moderate rate in a continuous system than in a batch system operating on the same total amount of catalyst. Even so, it is presently preferred to maintain a relative injection rate of at least about 2 s.c.f.m./lb. in continuous systems. Observations of that limit is much more essential in batch systems.

EXAMPLES 14–19

Six samples of the dry feed to the calciner in Examples 3–10, 12 and 13 were calcined by the procedure described in Example 1. Inlet air temperature was 75° F. in each instance. The characteristics of the resulting product and the activity of the catalysts are reported in Table 3.

conversion processes including, in particular, hydrocracking, hydrogenation, desulfurization and denitrogenation. Both of these examples were conducted on a feed stock identified in Table 4.

TABLE 4

Feed Properties

| | |
|---|---|
| Gravity, ° API | 17.9 |
| ASTM distillation, D–1160, ° F.: | |
| IBP/5 | 512/567 |
| 10/20 | 589/610 |
| 30/40 | 638/645 |
| 50/60 | 683/704 |
| 70/80 | 731/757 |
| 90/95 | 806/839 |
| Max./rec., vol. percent | 857/98 |
| Sulfur, X-ray, wt. percent | 3.54 |
| Nitrogen: | |
| Total, wt. percent | 0.183 |
| Basic, wt. percent | 0.0681 |
| Acid solubility, vol. percent | 68.5 |
| Universal high mass, wt. percent: | |
| Total saturates | 29.1 |
| Paraffins | 0.4 |
| Mononaphthenes | 8.8 |
| Polynaphthenes | 19.9 |
| Total aromatics [1] | 31.6 |
| Monoaromatics | 14.4 |
| Diaromatics | 10.7 |
| Triaromatics | 9.6 |
| Tetraaromatics | 5.2 |
| Pentaaromatics | 2.3 |
| Total sulfur compounds | 18.2 |

TABLE 3.—CALCINATION CONDITIONS

| Example number | Catalyst charge, lbs.[a] | Injection rate, s.c.f.m./lb. | Rate of heating, ° F./hr. | Max. temp., ° F. | Chemical composition, wt. percent | | | Denitrogenation activity | |
|---|---|---|---|---|---|---|---|---|---|
| | | | | | MoO$_3$ | NiO | P | Hrs. on feed | Percent of reference catalyst |
| 14 | 1.54 | 4.8 | 50 | 900 | 19.2 | 3.34 | 3.16 | 60 | 150 |
| 15 | 1.54 | 4.8 | 50 | 900 | 19.0 | 3.32 | 3.17 | 60 | 150 |
| 16 | 1.54 | 4.8 | 50 | 900 | 19.4 | 3.39 | 2.88 | 60 | 146 |
| 17 | 1.54 | 4.8 | 50 | 900 | 19.4 | 3.37 | 3.21 | 60 | 161 |
| 18 | 1.54 | None | 50 | 900 | 19.4 | 3.37 | 3.21 | 60 | 107 |
| 19 | 1.54 | None | 50 | 900 | 19.4 | 3.39 | 2.88 | 60 | 114 |

[a] Catalyst weight diminished about 14% on further drying and calcination.

It is apparent that the more intimate contacting of the air at the same equivalent air rate achieved in the batch calcination system results in the production of a catalyst having even higher denitrogenation activity, i.e., 150% of the activity of the reference catalyst. The necessity of providing intimate contact between substantial volumes of air and the catalyst during calcination is again demonstrated by comparison of Examples 18 and 19 to Examples 14 through 17. In Examples 18 and 19 the absence of air resulted in the production of catalysts having relative activities of only 107 and 114 percent respectively, whereas the catalysts of Examples 14–17 had substantially higher activities of 146 to 161 percent.

EXAMPLES 20 AND 21

These two examples demonstrate the utility of the methods of this invention with regard to several hydro-

| | |
|---|---|
| Monobenzothiophenes | 5.3 |
| Dibenzothiophenes | 2.7 |
| Tribenzothiophenes | 1.4 |
| Aromatic sulfides | 0.5 |
| Alkyl sulfides | 4.3 |
| Thiophenes | 4.0 |
| Total oxygen plus nitrogen | 5.3 |
| Olefins | 15.6 |
| UV-LEC saturates separation, wt. percent: | |
| Saturates | 29.1 |
| Aromatics plus sulfur compounds | 49.0 |
| Oxygen plus nitrogen hetero compounds | 6.3 |
| Olefins | 15.6 |

[1] Excludes 9.9% of total aromatics present as sulfur compounds and reported as such.

Example 20

The catalyst of this example was prepared by impregnating a gamma alumina support by the circulation dip technique with a solution containing an amount of ammonium heptamolybdate equivalent to 13.4 weight-percent $MoO_3$, an amount of nickelous nitrate hexahydrate equivalent to about 3.6 weight percent NiO, and about 1.2 to about 1.3 weight-percent phosphorus as othrophosphoric acid. The initial pH of the solution immediately prior to contact with the alumina substrate was 2.5. The $P/MoO_3$ ratio in the solution was about 0.11. The alumina support was contacted with a great excess of solution until the amount of material combined with the support corresponded to 16.6 weight-percent $MoO_3$, 3.27 weight-percent NiO, and 3.09 weight percent P.

The impregnated composite was dried for about one-half hour in a through circulation belt dryer at a temperature of about 240° F. and finally calcined at a temperature of about 900–950° F. maximum in an indirect fired rotary calciner with accelerated air flow injection. The air injection rate during calcination exceeded 5 s.c.f.m. of air per pound of composite.

This catalyst was used to convert the feed described in Table 4 in a single stage once-through fixed bed system. The reactor was operated at 740° F., 1275 p.s.i.g. and a liquid hourly space velocity (LSHV) of 0.59 with a once-through hydrogen injection rate of 6000 s.c.f./ barrel of hydrocarbon feed. The results of this operation are summarized in Table 5.

Example 21

The hydrogenative conversion described in Example 20 was repeated with the same catalyst at otherwise identical conditions with the exception of reaction temperature which was lowered to 715° F. The results of this operation are also summarized in Table 5.

TABLE 5

| Example number | 20 | 21 |
|---|---|---|
| Conditions: | | |
| Reactor temperature, °F | 740 | 715 |
| Reactor pressure, p.s.i.g | 1,275 | 1,275 |
| LHSV, v./v./hr | 0.59 | 0.59 |
| Hydrogen, s.c.f./b.b.l | 6,000 | 6,000 |
| Product properties: | | |
| Full range product: | | |
| Acid solubility, vol percent | 26.4 | 27.0 |
| Total nitrogen, p.p.m | 0.9 | 1.2 |
| Total aromatics, wt. percent | (34.9) | (38.3) |
| X–375° F. fraction: | | |
| Weight percent of product | 11.9 | 6.5 |
| Aromatics wt. percent of fraction | (15) | (21) |
| Wt. percent of total | (1.8) | (1.3) |
| 375–575° F. fraction: | | |
| Weight percent of product | 41.0 | 38.8 |
| Aromatics: | | |
| Wt. percent of fraction | (45) | (50) |
| Wt. percent of total | (18.4) | (19.4) |
| 575° F. plus fraction: | | |
| Weight percent of product | 46.0 | 54.6 |
| Aromatics, wt. percent of fraction: | | |
| Monoaromatics | 22.9 | |
| Diaromatics | 5.5 | |
| Triaromatics | 2.5 | |
| Tetraaromatics | 0.1 | |
| Total, percent of fraction | 31.9 | 32.3 |
| Total, percent of total | 14.7 | 17.6 |
| Sulfur, p.p.m | 14 | 39 |

The results of Examples 20 and 21 summarized in Table 5 illustrate several superior characteristics of the catalysts and methods of this invention. Most significant of these qualities include denitrogenation, desulfurization, hydrocracking and hydrogenation. The degree of hydrocracking activity exhibited by these compositions is illustrated in part by conversion to the X–375° F. and 375–575° F. fractions. It should be noted in this regard that about 7 percent of the original feedstock described in Table 4 boiled below 575° F. Consequently, that amount of material did not have to be converted during the reaction to be found in the fractions boiling below that temperature. Taking this factor into account it is apparent that 34% of the feed boiling above 575° F. was converted in Example 20. A conversion of 11.9 weight-percent to the X–375° F. fraction was obtained in that example.

The dramatic activity of the compositions and methods of this invention for desulfurization is also illustrated by the results of these examples. The sulfur content of the feed was reduced to 14 and 39 p.p.m. in Examples 20 and 21, respectively. The higher residual sulfur content in the latter example is attributable to the use of a lower reaction temperature in that operation.

These examples also further confirm the superior denitrogenation activity of the compositions and methods of this invention. The nitrogen content of the hydrocarbon stream was reduced to 0.9 and 1.2 p.p.m. in Examples 20 and 21, respectively.

These data also serve to illustrate the relatively high hydrogenation activity of these compositions and methods. The total aromatic concentration of the feed was about 41.5 weight-percent. This figure includes the sulfur containing aromatic percursors present in the feedstock such as monobenzothiophenes, dibenzothiophenes, tribenzothiophenes and aromatic sulfides. The relative degree of aromatic conversion achieved in Examples 20 and 21 was 18.3 and 7.7 percent, respectively. Again the lower activity in Example 21 is attributed to the lower reaction temperature prevailing during that operation. It should also be observed that the remaining aromatic compounds present in the product had been at least partially hydrogenated. For example, 20.2 and 20.7 percent of the product boiling below 575° F. in Examples 20 and 21, respectively, was aromatic. Consequently, it is reasonable to assume that these aromatic constituents had been at least partiall hydrogenated and hydrocracked in order to reduce their boiling point to a level below 575° F.

Numerous variations and modifications of the concept of this invention will be apparent to one skilled in the art in view of the foregoing disclosure and the appended claims.

I claim:

1. The hydrocarbon hydroconversion catalyst comprising a catalytically active amount of at least one of the metals, oxides and sulfides of Groups VI–B and VIII in combination with a foraminous refractory oxide support prepared by thermally activating a composite of said foraminous support and at least one thermally decomposable compound of the metals of Groups VI–B and VIII by heating said composite to a calcination temperature between about 800° F. and 1300° F. while intimately contacting said composite, at least during that period of said thermal activation when said thermally decomposable compounds are being decomposed, with air injected into intimate contact with said composite at an initial contact temperature between ambient and about 500° F., and at a rate of at least about 2 standard cubic feet per minute per pound of said composite.

2. The composition of claim 1 wherein said composite comprises at least about 1 weight-percent of at least one exothermically decomposable compound of at least one of cobalt, molybdenum, chromium, nickel and tungsten convertible to the corresponding metal oxides upon exposure to said oxidizing gas at said calcination temperature.

3. The catalyst of claim 1 wherein said composite is formed upon the impregnation of said foraminous support with a catalytic amount of at least one exothermically thermally decomposable water soluble compound of at least one of molybdenum, tungsten, chromium, nickel and cobalt convertible to the corresponding metal oxide upon exposure to said oxidizing gas at said calcination temperature, and said composite is heated to said calcination temperature at a rate of less than about 400° F. per hour.

4. The composition of claim 1 wherein said composite is formed upon the impregnation of said foraminous support with (a) a catalytically active amount of at least one of ammonium dimolybdate, ammonium phosphomolybdate, ammonium heptamolybdate, molybdic acid, molybdenum oxide, molybdenum blue and iron Group metal complex molybdates and phosphomolybdates and (b) at least one of the nitrates, sulfates, halides, carbonates, hydroxides and acetates of at least one of the iron Group metals.

5. The catalyst of claim 1 wherein said composite is formed upon the admixture of said foraminous support with (a) at least a catalytic amount of at least one exothermically thermally decomposable compound of at least one of molybdenum and tungsten, (b) a catalytically active amount of at least one of the nitrates, sulfates, fluorides, chlorides, bromides, carbonates and acetates of nickel and cobalt and at least one phosphorus containing compound.

6. The composition of claim 5 wherein said phosphorus containing compound is selected from ammonium phosphomolybdate, ammonium phosphotungstate, nickel and cobalt phosphomolybdates and phosphotungstates, and acids of phosphorus.

7. The hydrocarbon hydroconversion catalyst comprising a catalytically active amount of at least one of the metals, oxides and sulfides of at least one of molybdenum, tungsten, chromium, nickel and cobalt combined with a foraminous refractory oxide and prepared by thermally activating a composite of said foraminous oxide and at least one thermally decomposable compound selected from the nitrates, sulfates, halides, carbonates and acetates of at least one of molybdenum, tungsten, chromium, nickel and cobalt, and ammonium dimolybdate, ammonium heptamolybdate, ammonium tungstate, ammonium chromate, and ammonium, nickel and cobalt phosphomolybdates and phosphotungstates, including the steps of gradually increasing the temperature of said composite to a calcination temperature of about 800° to about 1300° F. sufficient to thermally activate said composite, and intimately contacting said composite during at least the portion of said calcination during which said compounds are being decomposed with at least about 2 standard cubic feet per minute of air per pound of said composite injected into intimate contact with said composite at an initial contact temperature between ambient and about 500° F.

8. The catalyst of claim 7 wherein said foraminous oxide is selected from at least one of alumina, silica, magnesia, zirconia, titania, beryllia, and chemical and physical combinations thereof.

9. The catalyst of claim 7 wherein said composite comprises at least about 1 weight-percent of at least one exothermically thermally decomposable compound of molybdenum, tungsten, chromium, nickel and cobalt determined as the corresponding metal oxide, said compound being convertible to the corresponding oxide upon exposure to said oxidizing gas at said calcination temperature.

10. The composition of claim 9 wherein said composite is contacted with about 3 to about 50 standard cubic feet per minute of air per pound of said composite during at least that period in which the temperature of said composite exceeds the decomposition temperature of at least one of said compounds.

11. The hydrocarbon conversion catalyst comprising a foraminous refractory oxide support selected from silica, alumina, magnesia, zirconia, beryllia, titania, and physical and chemical combinations thereof combined with at least one of the metals, oxides and sulfides of molybdenum, tungsten, chromium, nickel and cobalt, prepared by thermally activating a composite of said foraminous oxide and an exothermically thermally decomposable precursor compound of said metal, oxide or sulfide at a calcination temperature between about 800° F. and 1300° F. while intimately contacting said composite with at least about 3 standard cubic feet per minute of air per pound of said composite at least during the period of thermal decomposition of said exothermically decomposable precursor, the rate of heat evolution accompanying the decomposition of said thermally decomposable precursor being sufficient to elevate the temperature of said composite to a point within said calcination temperature range, said air being at a temperature between ambient and about 500° F. upon initial contact with said composite.

12. The composition of claim 11 wherein said composite of said foraminous oxide and said precursor is prepared by the combination of said oxide with a catalytic amount of at least one precursor selected from ammonium molybdates and tungstates, ammonium phosphomolybdates and tungstates, nickel and cobalt phosphomolybdates and tungstates, and the nitrates, carbonates, sulfates, and halides of nickel and cobalt.

13. The composition of claim 12 wherein said precursor is combined with said oxide by impregnation with an aqueous solution of said precursor and at least one acid of phosphorus.

References Cited
UNITED STATES PATENTS 3,609,099   9/1971   Mickelson _____ 252—435

CARL F. DEES, Primary Examiner

U.S. Cl. X.R.

252—437, 439, 458, 465, 468, 469